United States Patent
Saporetti

(10) Patent No.: US 10,354,426 B2
(45) Date of Patent: Jul. 16, 2019

(54) SYMBOL STITCHING IMAGING SYSTEM

(71) Applicant: Datalogic IP Tech, S.r.l., Bologna (IT)

(72) Inventor: Claudio Saporetti, Bologna (IT)

(73) Assignee: Datalogic IP Tech, S.r.l., Bologna (IT)

( * ) Notice: Subject to any disclaimer, the term of this patent is extended or adjusted under 35 U.S.C. 154(b) by 0 days.

(21) Appl. No.: 15/228,949

(22) Filed: Aug. 4, 2016

(65) Prior Publication Data
US 2018/0040150 A1 Feb. 8, 2018

(51) Int. Cl.
*G06K 9/00* (2006.01)
*G06T 11/60* (2006.01)
*H04N 5/247* (2006.01)

(52) U.S. Cl.
CPC ............... *G06T 11/60* (2013.01); *G06K 9/00* (2013.01); *H04N 5/247* (2013.01)

(58) Field of Classification Search
CPC ....... G06K 7/1491; G06K 2007/10485; G06K 7/1439; G06K 7/1443; G06K 7/1447; G06K 9/00; G06T 11/60; G06T 7/0002–001; G06T 3/0068–0081; G06T 7/30; G06T 7/38; H04N 5/247
USPC ........ 382/102, 101, 182, 183, 284, 110, 111, 382/112, 141, 143, 294
See application file for complete search history.

(56) References Cited

U.S. PATENT DOCUMENTS

| | | | | |
|---|---|---|---|---|
| 5,444,231 A | * | 8/1995 | Shellhammer | G06K 7/14 235/462.12 |
| 5,495,097 A | * | 2/1996 | Katz | G06K 7/10633 235/462.12 |
| 8,646,690 B2 | | 2/2014 | Nunnink et al. | |
| 2005/0224581 A1 | * | 10/2005 | Reichenbach | G06K 7/14 235/462.12 |
| 2009/0121027 A1 | * | 5/2009 | Nadabar | G06K 7/10544 235/470 |
| 2010/0277587 A1 | | 11/2010 | Pechatnikov et al. | |
| 2013/0200157 A1 | * | 8/2013 | Nunnink | G06K 7/1491 235/462.22 |
| 2014/0097251 A1 | * | 4/2014 | Joussen | G06K 7/1404 235/462.07 |
| 2015/0373279 A1 | | 12/2015 | Osborne et al. | |

(Continued)

FOREIGN PATENT DOCUMENTS

CN 101354250 A 1/2009

OTHER PUBLICATIONS

Bradley, Alexander J. E. "Depth of Field Explained." PetaPixel, https://petapixel.com/2016/05/18/depth-field-explained/. May 18, 2016.*

(Continued)

*Primary Examiner* — Geoffrey E Summers
(74) *Attorney, Agent, or Firm* — Cozen O'Connor

(57) ABSTRACT

Systems and methods to reduce the overlap areas of the fields of view of multiple cameras when reading symbols (e.g., barcode symbols, text) disposed on moving objects using an imaging system which includes an array of cameras. Each of a plurality of cameras may have a field of view directed toward objects positioned on a conveyor which moves the objects in a longitudinal direction, and the field of view of each of the plurality of cameras may overlap with the field of view of at least one other camera in the plurality of cameras in one or both of the longitudinal direction and a lateral direction orthogonal to the longitudinal direction.

25 Claims, 12 Drawing Sheets

(56) References Cited

U.S. PATENT DOCUMENTS

2016/0104020 A1* 4/2016 Bachelder ............ G06K 7/1465
　　　　　　　　　　　　　　　　　　　　　　235/462.12
2016/0295108 A1* 10/2016 Cao .................... H04N 5/23238
2017/0178379 A1* 6/2017 Fu .............................. G06T 7/80

OTHER PUBLICATIONS

"CC320." Gardasoft, http://www.gardasoft.com/LED-Controllers/CC320/. Jul. 23, 2016.*

* cited by examiner

SYMBOL STITCHING IMAGING SYSTEM

BACKGROUND

Technical Field

The present disclosure generally relates to imaging systems which read symbols, such as text and machine-readable symbols.

Description of the Related Art

Imaging systems that perform measurement, inspection, alignment of objects and or decoding of symbols (e.g., machine readable symbols, text) are used in a wide range of applications and industries. These systems utilize one or more image sensors which acquire images of an object, and process these acquired images using a suitable processor-based imaging system to perform one or more imaging system processes to generate the desired output based upon the image's processed information. This image information is generally provided as an array of image pixels each having various colors and/or intensities. In the example of a machine-readable symbol reader, the user or an automated process acquires images of an object that is believed to contain one or more machine-readable symbols (e.g., barcodes symbols). One or more images may be processed to identify machine-readable symbol features, which are then decoded by a decoding process to obtain information represented by the machine-readable symbol. A similar process may be used to identify alphanumeric data (e.g., letters, numbers), which process may be referred to as optical character recognition (OCR).

One use for machine-readable symbol readers, also referred to herein as imaging systems or imagers, is to track objects moving along a line (e.g., a conveyor belt) in manufacturing and logistics environments. In such applications, the imaging system may be positioned above or on one or more sides of the line at an appropriate viewing angle to acquire any expected machine-readable symbols on respective objects as they move through a field of view of the imaging system. The focal distance of the imaging system with respect to an object may vary depending on the placement of the imaging system with respect to the line and the size of the object. That is, a larger object may cause machine readable symbols thereon to be located closer to the imaging system, while smaller/flatter objects may contain machine-readable symbols that are further from the imaging system. In each case, the machine-readable symbol should appear with sufficient resolution to be properly imaged and decoded. Therefore, the field of view of a single camera of an imaging system, particularly in the widthwise or lateral direction (perpendicular to line motion), may be limited. If an object and/or the conveyor line are relatively wide, the lens and sensor of a single imaging system may not have a sufficient field of view in the lateral direction to cover the entire width of the line while maintaining the needed resolution for accurate imaging and decoding of machine-readable symbols. Failure to image the full width of a line may cause the imaging system to miss machine-readable symbols that are outside of the field of view.

There are at least a few techniques that may be employed to overcome the limitation in field-of-view of a single imaging system. For example, one can employ multiple imaging systems focused side-by-side to fully cover the width of a conveyor line. Alternatively, a line-scan system with inherently wider field of view may be employed. Yet another example is to employ a larger sensor in a single imaging system to provide the desired resolution for imaging the scene along the widthwise direction. However, several of these solutions are undesirable due to increased cost, hardware, optics, and/or complexity.

BRIEF SUMMARY

An imaging system to read symbols on objects conveyed by a conveyor, the conveyor having a movable support surface which lies in a plane which extends in a lateral direction (X) and a longitudinal direction (Y) orthogonal to the lateral direction (X), in operation the conveyor conveys the objects positioned thereon in the longitudinal direction (Y), the imaging system may be summarized as including: an array of cameras, comprising: a first camera directed toward the conveyor and rotated with respect to the longitudinal direction (Y) such that an optical axis of the first camera has a non-zero angle with respect to a normal direction (Z) in a plane which lies in the lateral direction (X) and the normal direction (Z), the normal direction (Z) orthogonal to the lateral direction (X) and the longitudinal direction (Y); and a second camera positioned proximate to the first camera and directed toward the conveyor, the second camera rotated with respect to the longitudinal direction (Y) such that an optical axis of the second camera has a non-zero angle with respect to the normal direction (Z) in a plane which lies in the lateral direction (X) and the normal direction (Z), at least a portion of the second camera aligned with at least a portion of the first camera with respect to the longitudinal direction (Y) to form the array of cameras along the longitudinal direction (Y).

The first camera may have a first field of view and the second camera may have a second field of view, the first field of view at least partially overlaps with the second field of view in at least the lateral direction (X). The array of cameras may have a total depth of field which spans between a near limit and a far limit, and a number of pixels in the first field of view which overlaps with a number of pixels in the second field of view is constant between the near limit and the far limit of the total depth of field. The first and second cameras may be rotated with respect to the lateral direction (X) such that the respective optical axes of the first and second cameras have a non-zero angle with respect to the normal direction (Z) in a plane which lies in the longitudinal direction (Y) and the normal direction (Z). The first camera may have a first field of view and the second camera may have a second field of view, the first field of view overlaps with the second field of view in at least the longitudinal direction (Y). The first and second cameras may have respective entrance pupils which are aligned with each other in the longitudinal direction (Y). The second camera may be spaced apart from the first camera in the longitudinal direction (Y) by a separation distance, and during operation the first camera and the second camera may be synchronized based at least in part on the separation distance and a velocity of the conveyor to obtain respective images which are parallel with each other with respect to the longitudinal direction (Y). In operation the first camera and the second camera may each partially decode a symbol and determine a location of the partially decoded symbol. In operation one of the first camera and the second camera may transmit the respective partially decoded symbol and determined location of the partially decoded symbol to the other of the first camera and the second camera. In operation each of the first and second cameras may transmit the respective partially decoded symbol and determined location of the partially decoded symbol to a processor-based system to be processed thereby.

An imaging system to read symbols on objects conveyed by a conveyor, the conveyor having a movable support surface which lies in a plane which extends in a lateral direction (X) and a longitudinal direction (Y) orthogonal to the lateral direction (X), in operation the conveyor conveys the objects positioned thereon in the longitudinal direction (Y), the imaging system may be summarized as including: a plurality of cameras, each of the plurality of cameras having a field of view directed toward the objects positioned on the conveyor, and the field of view of each of the plurality of cameras overlaps with the field of view of at least one other camera in the plurality of cameras, each of the cameras having a respective optical axis which has an oblique angle with respect to a normal direction (Z) in a plane which lies in the lateral direction (X) and the normal direction (Z), the normal direction (Z) orthogonal to the lateral direction (X) and the longitudinal direction (Y).

Each of the cameras may have a respective optical axis which has an oblique angle with respect to at least one of: the normal direction (Z) in a plane which lies in the longitudinal direction (Y) and the normal direction (Z), or the normal direction (Z) in a plane which lies in the lateral direction (X) and the longitudinal direction (Y). Each of the plurality of cameras may be positioned above the conveyor. Each of the plurality of cameras may be positioned on a lateral side of the conveyor. The plurality of cameras may include at least three cameras. The field of view of each of the plurality of cameras may at least partially overlap with the field of view of at least one other camera in the plurality of cameras in at least the lateral direction (X). The plurality of cameras may have a total depth of field which spans between a near limit and a far limit, and a number of pixels in the field of view of one of the cameras which overlaps with a number of pixels in the field of view of at least one other camera in the plurality of cameras may be constant between the near limit and the far limit of the total depth of field. The plurality of cameras may have respective entrance pupils which are aligned with each other in the longitudinal direction (Y). During operation the plurality of cameras may be synchronized based at least in part on a separation distance between the cameras and a velocity of the conveyor to obtain respective images which are parallel with each other with respect to the longitudinal direction (Y). In operation each of the plurality of cameras may partially decode a symbol and determine a location of the partially decoded symbol. In operation at least one of the plurality of cameras may transmit the respective partially decoded symbol and determined location of the partially decoded symbol to at least one other of the plurality of cameras. In operation each of the plurality of cameras may transmit the respective partially decoded symbol and determined location of the partially decoded symbol to a processor-based system to be processed thereby.

A method of operation for an imaging system to read symbols on objects conveyed by a conveyor, the conveyor having a movable support surface which lies in a plane which extends in a lateral direction (X) and a longitudinal direction (Y) orthogonal to the lateral direction (X), in operation the conveyor conveys the objects positioned thereon in the longitudinal direction (Y), the method may be summarized as including: positioning a first camera toward the conveyor, the first camera rotated with respect to the longitudinal direction (Y) such that an optical axis of the first camera has a non-zero angle with respect to a normal direction (Z) in a plane which lies in the lateral direction (X) and the normal direction (Z), the normal direction (Z) orthogonal to the lateral direction (X) and the longitudinal direction (Y); positioning a second camera proximate to the first camera and directed toward the conveyor, the second camera rotated with respect to the longitudinal direction (Y) such that an optical axis of the second camera has a non-zero angle with respect to the normal direction (Z) in a plane which lies in the lateral direction (X) and the normal direction (Z), at least a portion of the second camera aligned with at least a portion of the first camera with respect to the longitudinal direction (Y) to form the array of cameras along the longitudinal direction (Y); and causing each of the first camera and second camera to capture respective images of an object positioned on the conveyor.

A method of operation for an imaging system to read symbols on objects conveyed by a conveyor, the conveyor having a movable support surface which lies in a plane which extends in a lateral direction (X) and a longitudinal direction (Y) orthogonal to the lateral direction (X), in operation the conveyor conveys the objects positioned thereon in the longitudinal direction (Y), the method may be summarized as including: positioning a plurality of cameras toward the objects positioned on the conveyor, each of the plurality of cameras having a field of view which overlaps with the field of view of at least one other camera in the plurality of cameras, each of the plurality of cameras having a respective optical axis which has an oblique angle with respect to a normal direction (Z) in a plane which lies in the lateral direction (X) and the normal direction (Z), the normal direction (Z) orthogonal to the lateral direction (X) and the longitudinal direction (Y); and causing each of the plurality of cameras to capture respective images of an object positioned on the conveyor.

An imaging system to read symbols on objects conveyed by a conveyor, the conveyor having a movable support surface which lies in a plane which extends in a lateral direction (X) and a longitudinal direction (Y) orthogonal to the lateral direction (X), in operation the conveyor conveys the objects positioned thereon in the longitudinal direction (Y), the imaging system may be summarized as including: a first camera positioned proximate the conveyor; and a second camera positioned proximate the conveyor, at least a portion of the second camera collinear with at least a portion of the first camera with respect to an axis which extends in the longitudinal direction (Y); wherein each of the first and second cameras are rotated with respect to the longitudinal direction (Y) such that respective fields of view of the first and second cameras overlap in the lateral direction (X), and each of the first and second cameras rotated with respect to the lateral direction (X) such that the respective fields of view of the first and second cameras overlap in the longitudinal direction (Y).

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to systems and methods to reduce the overlap areas of the fields of view of multiple cameras when reading symbols (e.g., barcodes, text) disposed on moving objects using an array of cameras.

Figure 1:
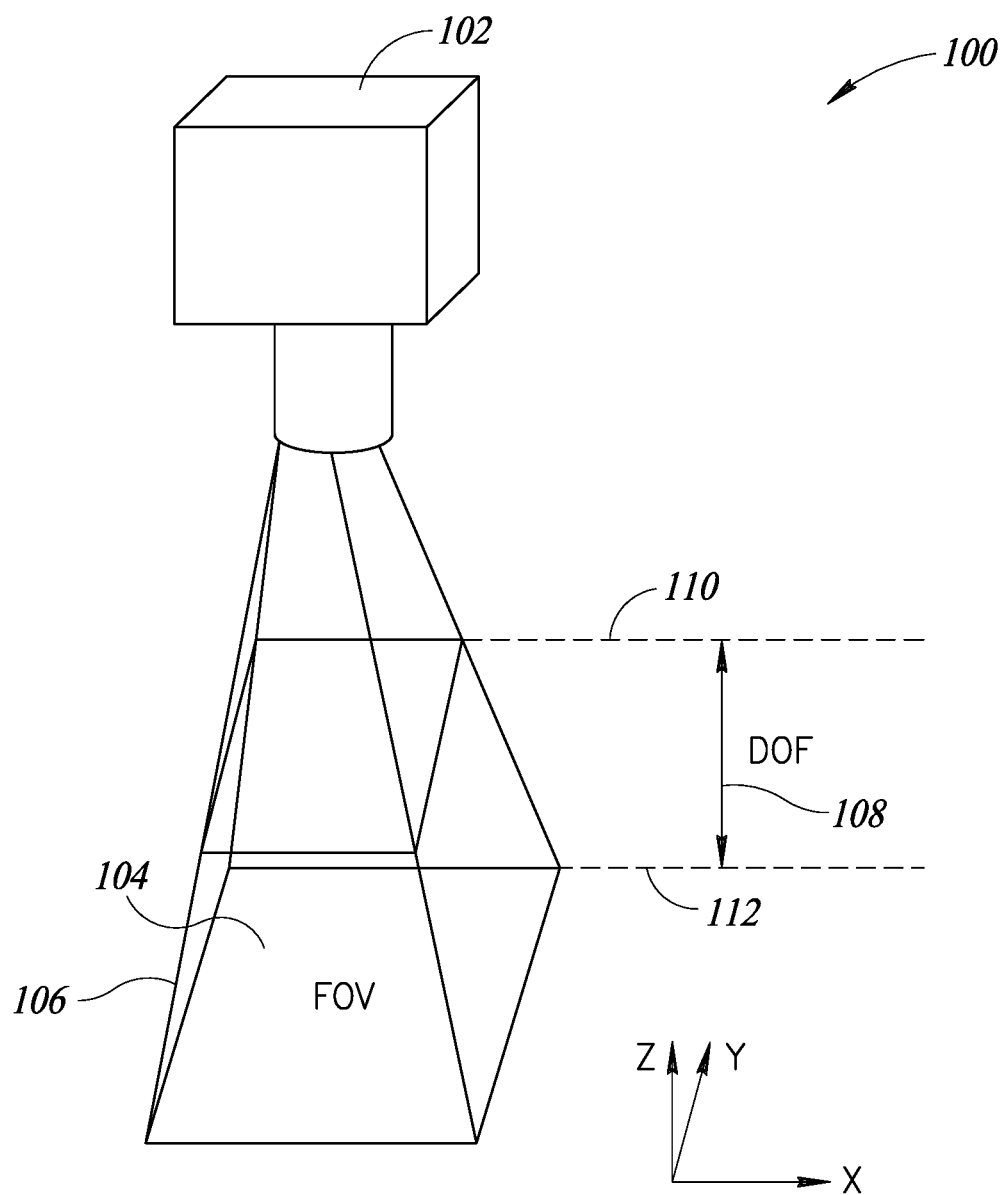
FIG. 1 is a perspective view of an imaging system which includes a single camera, according to one illustrated implementation.

FIG. 1 shows a perspective view of an example of an imaging system 100 which includes a single camera 102. The imaging system 100 may be used to read one-dimensional (e.g., barcode symbols) or two-dimensional (e.g., area or matrix code symbols) machine-readable symbols and/or to perform optical character recognition. In operation, the camera 102 acquires an image of an object in its reading area 104 and the image is processed to extract the information from all visible symbols.

The camera 102 has an associated field of view (FOV) 106, which is the area that is seen at any given moment by the camera. Normally, the FOV 106 of the camera 102 is rectangular in shape. Generally, the FOV 106 of the camera 102 is dependent on the sensor of the camera and on the type of lens used in the camera. As shown in FIG. 1, the dimensions of the FOV 106 increase linearly with distance.

The number of pixels per linear space unit is referred to as "resolution." In many implementations, the resolution of the camera 102 may be equal in the X and Y directions (as shown in FIG. 1), but such need not be the case.

The camera 102 also has an associated depth of field (DOF) 108. Generally, the DOF 108 is the distance between the nearest and farthest objects in a scene that appear acceptably sharp in an image captured by the camera 102. For example, an image may be acceptably sharp if the camera 102 is able to decode a symbol present in the image. Although the camera 102 can precisely focus at only one distance at a time, the decrease in sharpness is gradual on each side of the focused distance, so that within the DOF 108, the sharpness of an image is acceptable. The DOF 108 depends on the type of symbols to be read, in particular on the ratio between the symbol elements and the camera resolution at each distance, as well as the lens characteristics of the camera 102. In the example shown in FIG. 1, the DOF 108 of the camera 102 spans between a near limit 110 and a far limit 112.

Providing cameras which are able to guarantee the DOF and FOV required to provide symbol reading in real-world applications is often difficult and expensive. In particular, given a minimum resolution, a large FOV requires image sensors with a very large number of pixels, expensive lenses and powerful illuminators. As noted above, a known way to overcome this limitation for detecting moving objects is to use arrays of cameras instead of a single camera in an imaging system.

Figure 2:
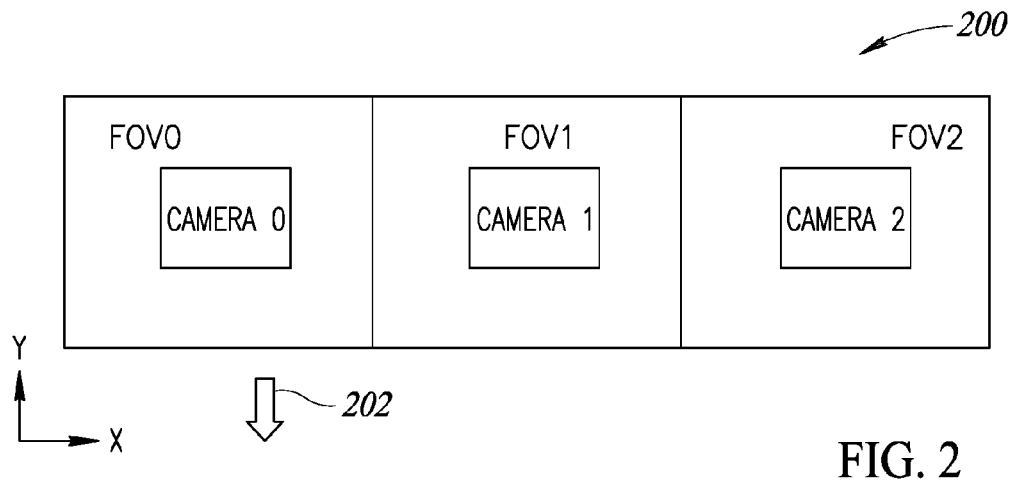
FIG. 2 is a top plan view of an imaging system which includes three cameras, according to one illustrated implementation.
Figure 3:
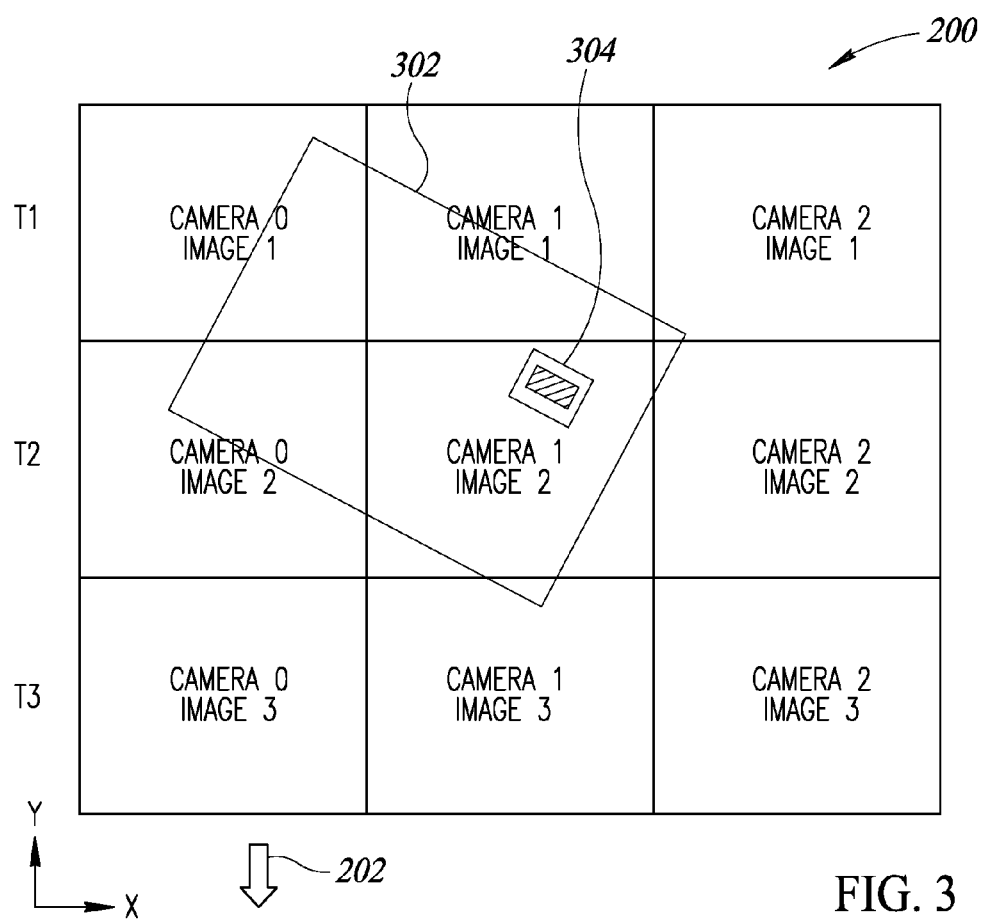
FIG. 3 is a top plan view of the imaging system of FIG. 2 which illustrates successive images captured by the three cameras at three different time periods, according to one illustrated implementation.

FIG. 2 shows an imaging system 200 which includes three cameras, designated camera 0, camera 1 and camera 2. The cameras 0-2 are disposed above and arranged in a lateral direction (X) across the width of a conveyor (not shown) which moves objects in a longitudinal direction (Y), as indicated by an arrow 202. Each of the cameras 0, 1 and 2 is associated with a field of view FOV0, FOV1 and FOV2, respectively. As shown in FIG. 3, as an object 302 which includes a symbol 304 is moved in the longitudinal direction (Y) by a conveyor, the cameras 0-2 acquire and decode many images of the object 302 at times T1, T2 and T3. The complete set of images guarantees that any symbol (e.g., symbol 304) on the object 302 is acquired at least one time by at least one of the cameras 0-2 as the object moves via the conveyor past the cameras.

In theory, symbols on the border between two adjacent acquisitions are readable by combining two or more of the acquired images. Combining multiple images together to compose a larger image is generally referred to as "image stitching." In practice, exchanging images between multiple cameras is difficult but, importantly, obtaining perfectly adjacent or "touching" fields of view is impossible even on a perfectly flat object at a constant distance. In reality, any minimum mounting error or synchronization error causes many-pixels errors that make reading symbols difficult or impossible.

Figure 4:
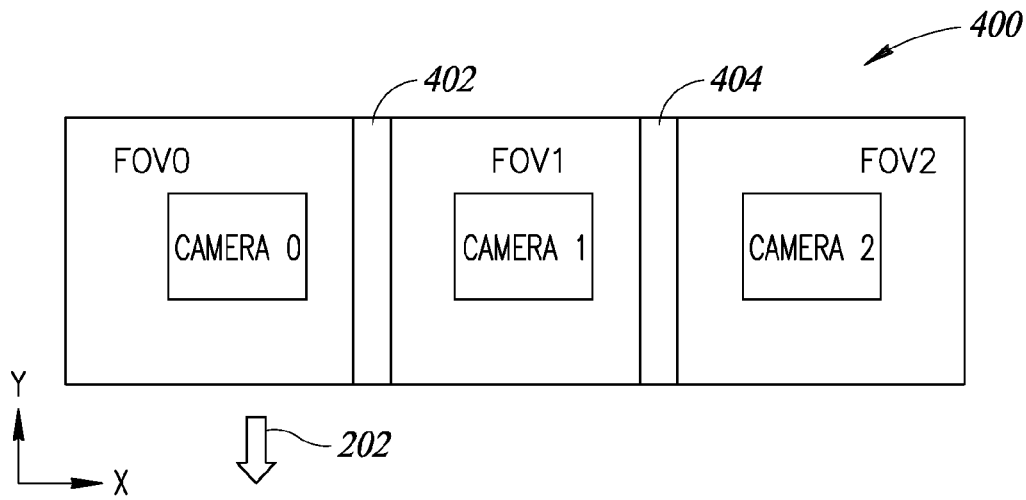
FIG. 4 is a top plan view of an imaging system which includes three cameras, wherein each of the three cameras has a field of view that overlaps with a field of view of an adjacent camera, according to one illustrated implementation.
Figure 5:
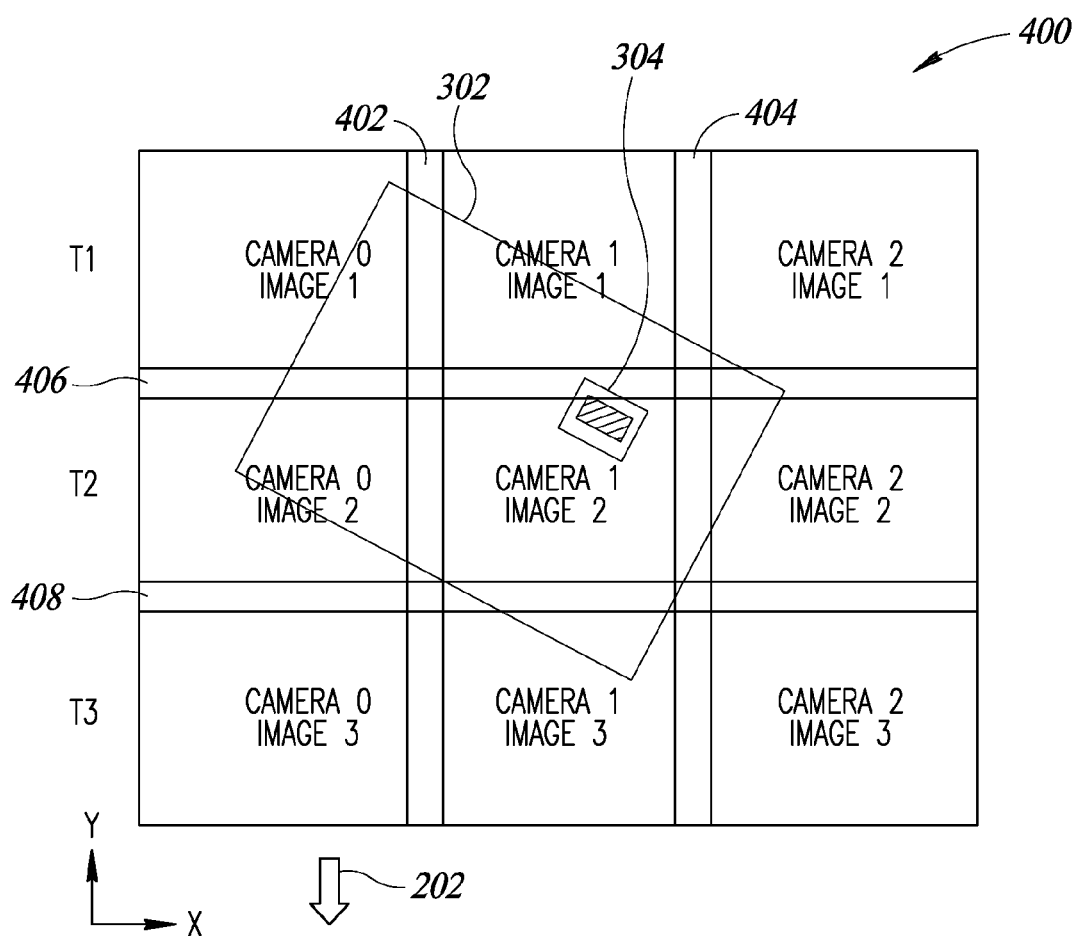
FIG. 5 is a top plan view of the imaging system of FIG. 4 which illustrates successive images captured by the three cameras at three different time periods, according to one illustrated implementation.

FIG. 4 shows a solution to this problem, which is to provide an imaging system 400 which includes overlapping fields of view FOV0, FOV1 and FOV2 for the cameras 0, 1 and 2, respectively. In particular, FIG. 4 shows an overlap area 402 between the FOV0 and FOV1 of cameras 0 and 1, respectively, and an overlap area 404 between the FOV1 and FOV2 of cameras 1 and 2, respectively. FIG. 5 shows successive images captured by the three cameras 0-2 at three different time periods T1, T2 and T3, with temporal-based overlap areas 406 and 408. In theory, for flat objects at a very well-known distance, it is possible to rebuild a complete image from multiple images based on a preliminary calibration. Such allows for reading symbols on a border between the FOVs of two adjacent cameras (e.g., camera 0 and camera 1, or camera 1 and camera 2). In practice, dynamic errors, such as acquisition jitter, vibrations, mechanical misalignments due to temperature, do not allow a composition of multiple images based only on a calibration. Instead, it may be necessary to utilize more complex algorithms to dynamically estimate the real overlap area between fields of view of the adjacent cameras in a multiple camera imaging system. Such algorithms, usually based on correlation, are extremely computationally intensive and the results are often not accurate enough to allow for reading of symbols on the stitching border.

In most cases, instead of requiring perfect image stitching, the overlap areas 402 and 404 are made to be large enough to fully contain the largest symbol to be decoded and, therefore, to allow at least one camera to capture the entire symbol without requiring composition of multiple images. This technique is simple but, based on the maximum length of a symbol, the dimension of overlap required may cover a high percentage of the total acquired area. As can be appreciated, this reduces the total system FOV and increases the amount of computing power required to process the images.

Figure 6:
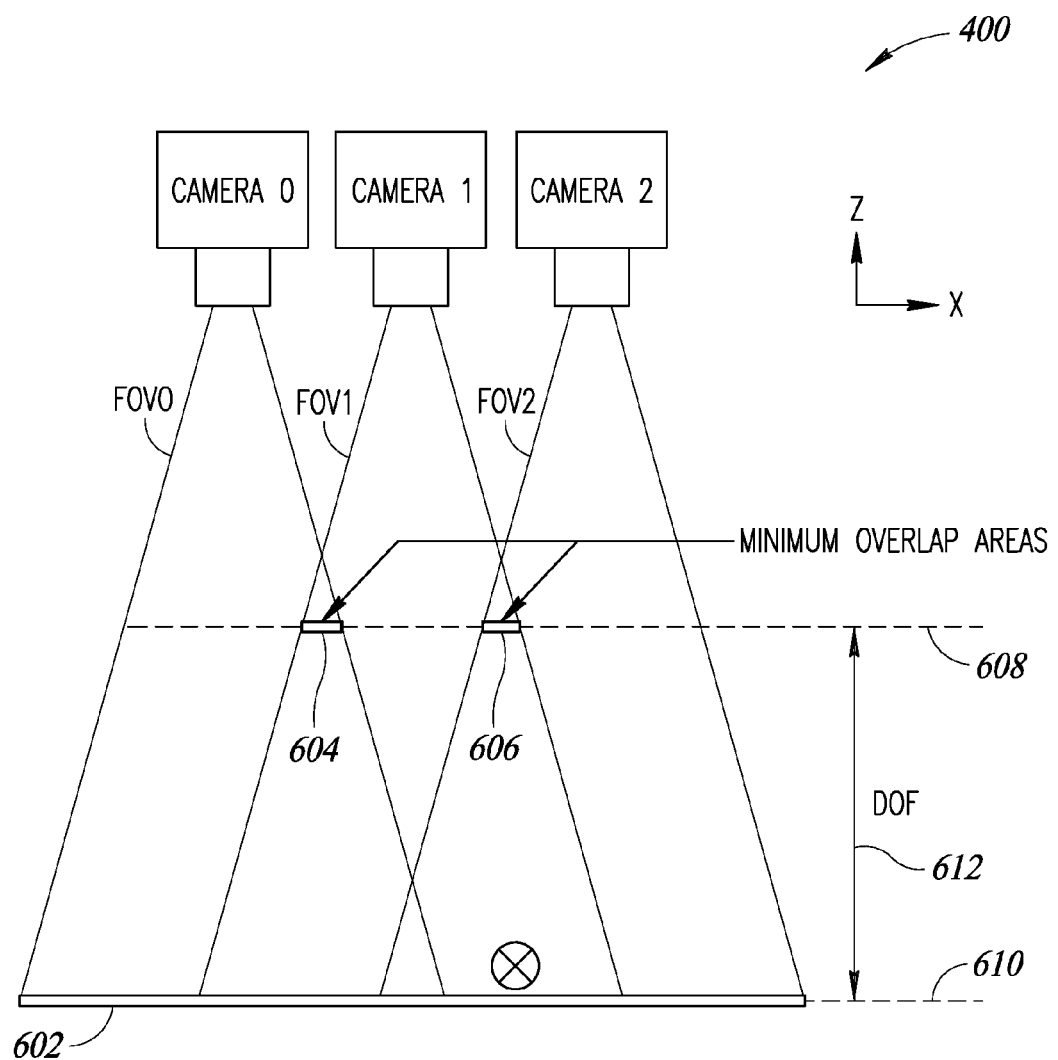
FIG. 6 is a front elevational view of the imaging system of FIG. 4 which illustrates minimum overlap areas, according to one illustrated implementation.

Further, if the objects are not all at the same distance (i.e., DOF>0), the aforementioned problem of the overlap areas becomes even more critical. Such problem is illustrated in FIG. 6, which is a front elevational view of the imaging system 400 of FIG. 4 positioned over a conveyor 602 (e.g., conveyor belt) which moves objects thereon in the longitudinal direction (Y) (into the page as shown in FIG. 6). FIG. 6 shows minimum overlap areas 604 and 606 between the FOVs of cameras 0 and 1 and cameras 1 and 2, respectively. Since a minimum overlap area needs to be maintained at all of the distances between a near limit 608 of the DOF 612 and a far limit 610 of the DOF, the overlap area at the far limit or maximum distance may cover a substantial portion or even all of the acquired area. That is, some portions of the object may be acquired more than two times by more than two cameras. Knowing the distance of an object allows for minimization of the overlap in the longitudinal direction (Y) and allows for reduction of the required processing power by avoiding re-processing the overlapped area too many times. However, the number of cameras required and the resulting costs of the installation of the camera system do not change.

Figure 7:
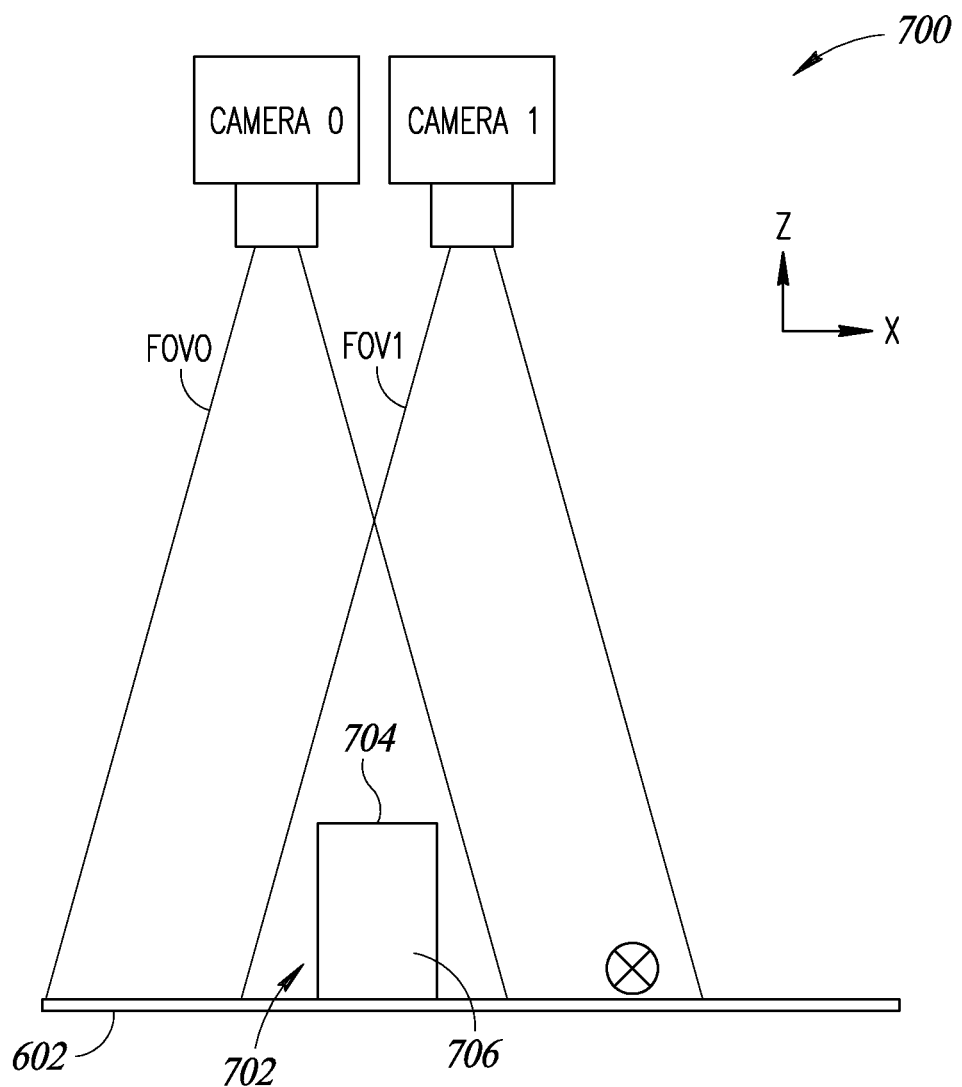
FIG. 7 is a front elevational view of an imaging system which includes two cameras, according to one illustrated implementation.
Figure 8:
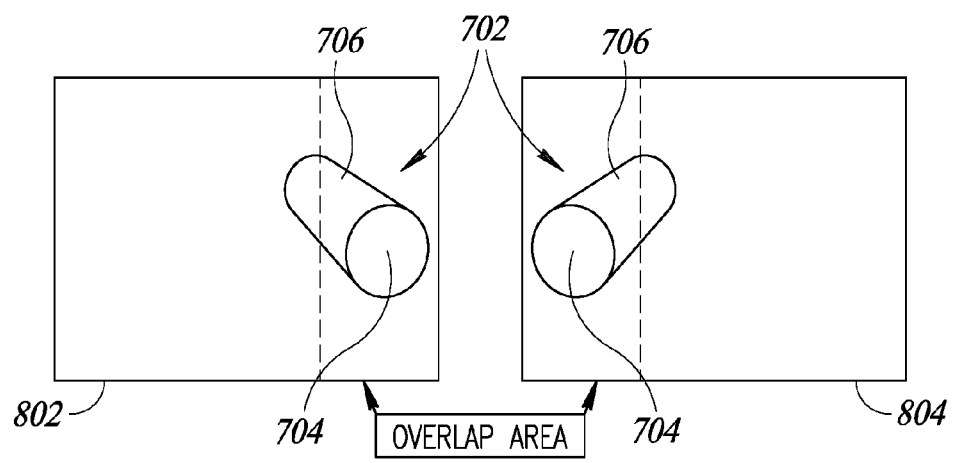
FIG. 8 shows example images of an object captured by the two cameras of the imaging system of FIG. 7, according to one illustrated implementation.

Additionally, imaging objects which are not perfectly flat introduces perspective distortion effects which make image stitching difficult or in some instances even impossible. FIG. 7 shows an imaging system 700 which includes the cameras 0 and 1 positioned over a cylindrically shaped object 702 which is moved by the conveyor 602. FIG. 8 shows images 802 and 804 of the object 702 captured by cameras 0 and 1, respectively. In the examples of FIGS. 7 and 8, a portion of an image representing the top, flat portion 704 of the cylindrically shaped object 702 may be perfectly matched for image stitching, but a portion of an image representing a sidewall portion 706 of the object may not be matched for image stitching due to perspective distortion effects. In theory, knowing the distance of the object 702 for every pixel of an image would allow for removing of perspective effects and allow for applying image stitching, but in practice the distance of the object for every pixel is not given or cannot be estimated with sufficient precision.

Figure 9:
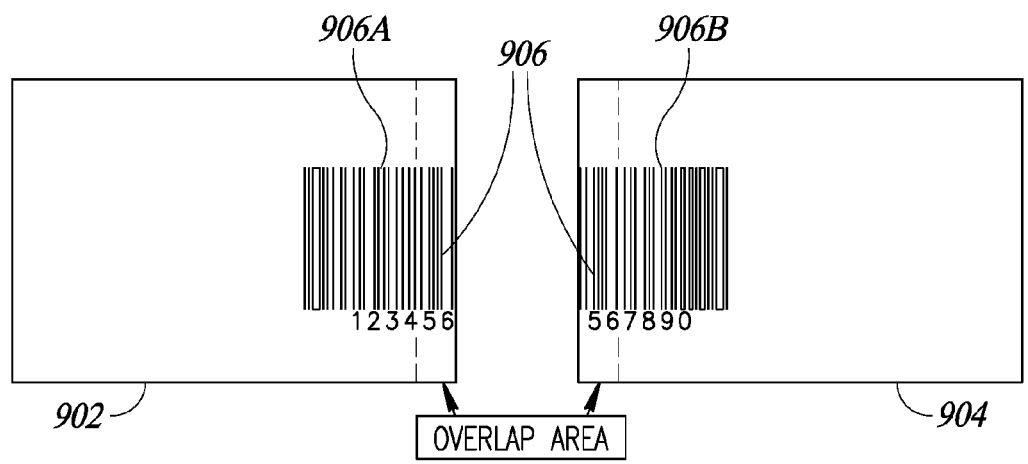
FIG. 9 shows example images of a barcode captured by the two cameras of the imaging system of FIG. 7, according to one illustrated implementation.

An alternative to image stitching is referred to as "symbol stitching" or "code stitching," which is the process of forming a complete symbol (e.g., barcode symbol) from symbol fragments found in multiple images. FIG. 9 shows example images 902 and 904 of a barcode symbol 906 captured by the cameras 0 and 1, respectively, of the imaging system 700 shown in FIG. 7. The barcode symbol 906 includes a number of bars which encode information representing the number string "1234567890." In the example of FIG. 9, camera 0 captures the image 902 which includes a left portion 906A of the barcode symbol 906, and camera 1 captures the image 904 which includes a right portion 906B of the barcode symbol.

Each of the two cameras 0 and 1 are able to localize and read some of the individual characters of the barcode symbol 906, but neither of the cameras are able to read the entire information contained in the barcode symbol. Nor can either of the cameras 0 and 1 check the barcode symbol 906 in the case check digits are provided.

An example code stitching process to read the barcode symbol 906 may include the following steps. Camera 0 localizes the left portion 906A of the barcode symbol 906 and reads the numbers "123456." Camera 1 localizes the right portion 906B of the barcode symbol 906 and reads the numbers "567890." Camera 1 may then send its partial information to camera 0, which may recognize that the partial information received from camera 1 belongs to the same barcode symbol 906 and that the characters "5" and "6" are redundant. Camera 0 may then rebuild the entire content (i.e., "1234567890") of the barcode symbol 906.

The steps of localizing and partially decoding the barcode symbol 906 are not trivial and require capturing a minimum partial barcode symbol (e.g., a quiet zone and a start). Further, the overlap area (FIG. 9) needs to guarantee this minimum information is available to each of the cameras 0 and 1. Additionally, for camera 0 to recognize that the partial information received from camera 1 belongs to the same barcode symbol 906, the information transmitted from camera 1 needs to contain the position of the symbols (e.g., bars composing characters) in the overlap area and this position needs to be translated into the coordinates of camera 0 with a sufficient precision to recognize the repetitive sequence of symbols.

Figure 10:
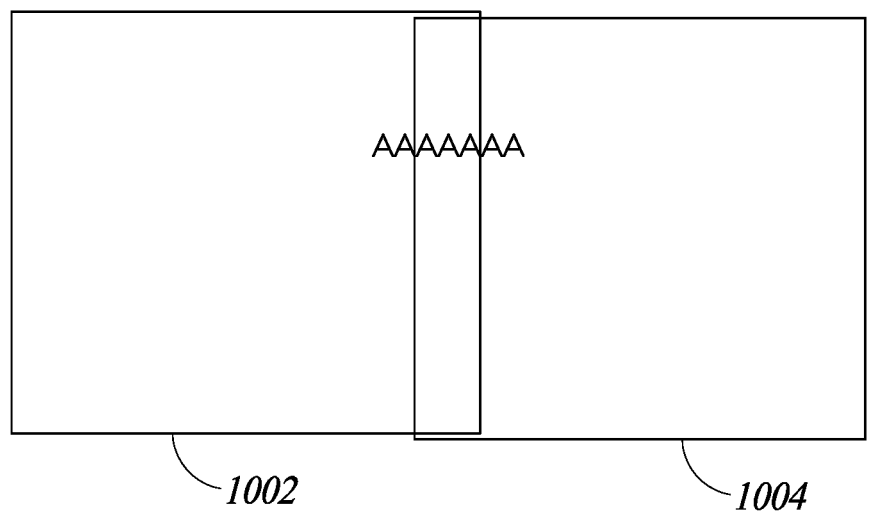
FIG. 10 shows example images of a first pattern of text captured by the two cameras of the imaging system of FIG. 7, according to one illustrated implementation.
Figure 11:
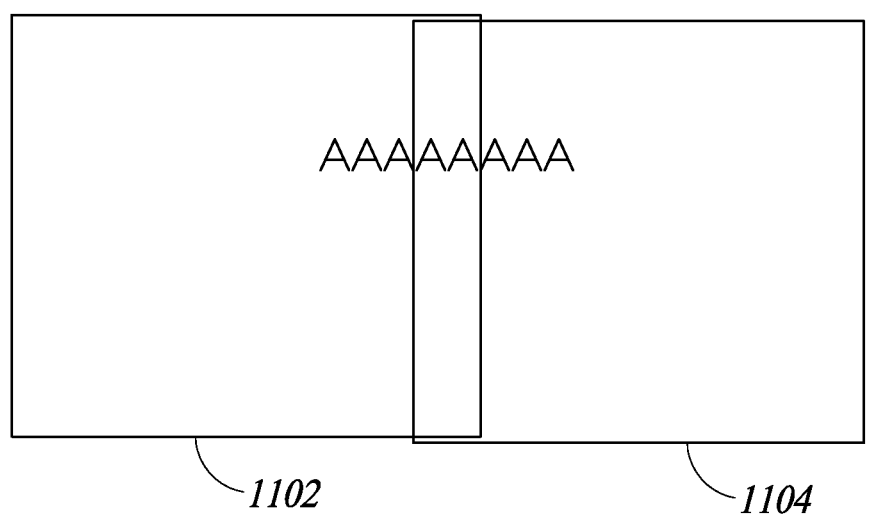
FIG. 11 shows example images of a second pattern of text captured by the two cameras of the imaging system of FIG. 7, according to one illustrated implementation.
Figure 12:
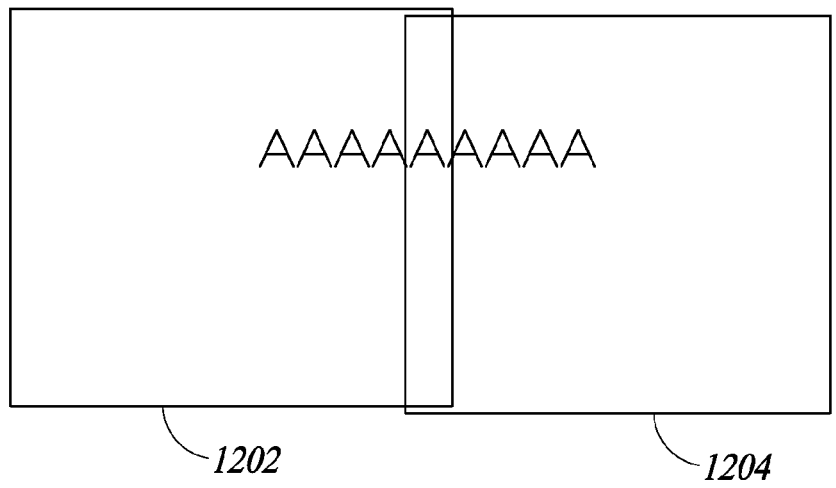
FIG. 12 shows example images of a third pattern of text captured by the two cameras of the imaging system of FIG. 7, according to one illustrated implementation.

For example, suppose that both of the cameras 0 and 1 read a string "AAAAA" without sufficiently precise coordinate information. The total string could actually be "AAAAAAA," as shown by the images 1002 and 1004 of FIG. 10, "AAAAAAAA," as shown by the images 1102 and 1104 of FIG. 11, or "AAAAAAAAA" as shown by the images 1202 and 1204 of FIG. 12, for example.

Normally, the process of coordinate translation requires knowledge of the distance of the object. If the distance of the object is not known, the overlap area between adjacent images needs to be larger than the size of the maximum possible repetitive pattern, which in most cases is the length of the entire symbol (e.g., symbol "AAAAAAA"). The larger a symbol is, in terms of the number of pixels in an image, the more the imaging system can tolerate an error while translating the symbol's coordinates from the coordinates of one camera to the coordinates of another camera. In other words, using large symbols allows for fairly large errors in knowledge regarding the object's distance and the object's perspective distortion. However, larger symbols require larger overlapping areas. Typically, the dimensions of a single barcode character of a barcode symbol depend on the code type and on resolution. In some implementations, a barcode character of a barcode symbol may have dimensions of about 1.5 mm or approximately 15 pixels.

In view of the above discussion, it is desirable to provide a multiple camera imaging system which minimizes the number of cameras required (by minimizing the required overlap areas), minimizes the required processing power, minimizes the information transmitted between adjacent cameras, minimizes the required calibration process, and avoids the use of additional sensors, while guaranteeing reliable reading of symbols at the worst acquisition conditions.

Figure 13:
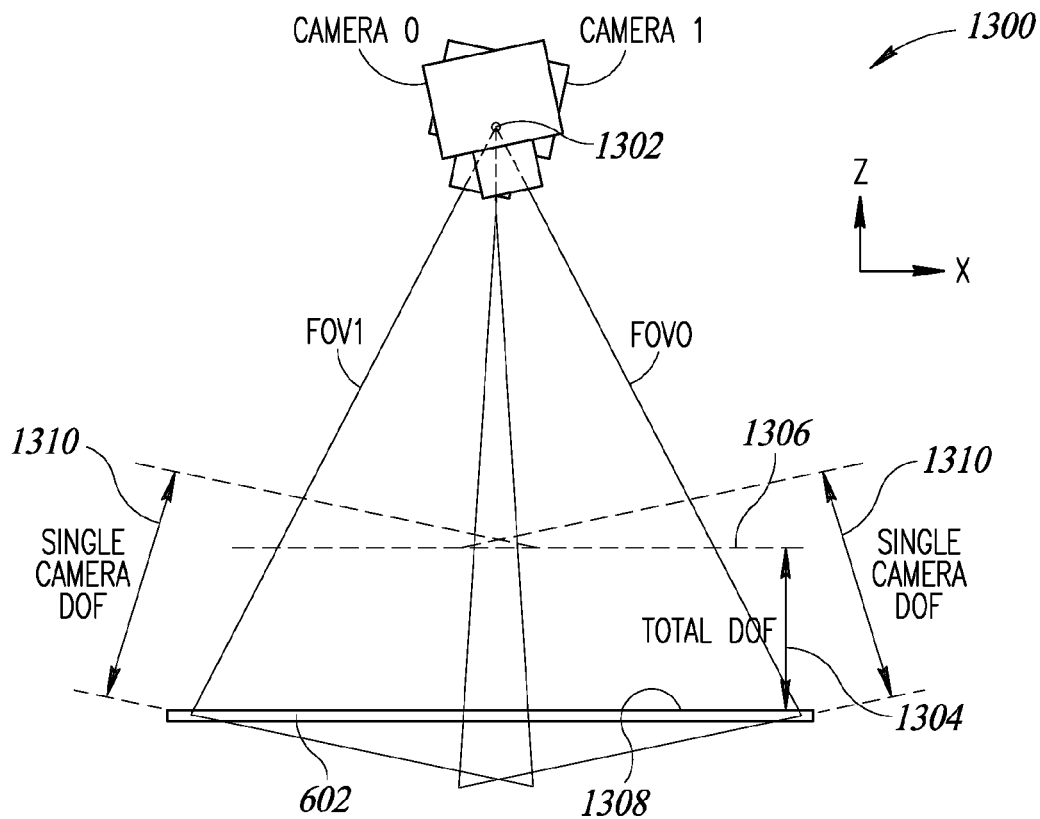
FIG. 13 is a front elevational view of an imaging system which includes two cameras that are rotated with respect to a longitudinal direction, according to one illustrated implementation.

FIG. 13 is a front elevational view of an imaging system 1300 which includes two cameras, cameras 0 and 1, which are disposed above and arranged in a longitudinal direction (Y) across a length of the conveyor 602. The cameras 0 and 1 are rotated in opposite directions about a rotation point 1302 with respect to the longitudinal direction (Y), such that the individual FOVs (FOV0 and FOV1) of the cameras 0 and 1 partially overlap and span a width of the conveyor which extends in the lateral direction (X). In some implementations, the cameras 0 and 1 may be positioned such that the rotation point 1302 is exactly the entrance pupil position of the two cameras (the vertex of angle of view of the camera). In such implementations, there is a constant number of overlapping pixels along the total system DOF 1304 of the imaging system 1300 between a near limit 1306 and a far limit 1308 of the total system DOF 1304. Although perspective distortion effects inside the imaging area are not the same for both cameras 0 and 1, this configuration avoids the problem of repetitive code patterns discussed above since the content of the overlapped area is known to both of the cameras 0 and 1, which allows for effective code stitching. In this implementation, the overlap area could be as large as one symbol at the near limit 1306 of the total system DOF 1304, for example.

In some implementations, the cameras 0 and 1 may be positioned at different longitudinal (Y) positions. In such implementations, images may be acquired at different times using the known distance between the cameras 0 and 1 and the velocity of the conveyor 602 to obtain two parallel images.

As shown in FIG. 13, in this implementation the total system DOF 1304 ("total DOF") may be lower than the DOF 1310 of a single camera ("single camera DOF"). This problem may increase in implementations with more than two cameras. This problem may be avoided by utilizing various mechanics and optics, although in some applications such may be undesirable (e.g., due to added cost or complexity).

In some instances, mounting two (or more) cameras with the required precision can be difficult or impossible. The different overlap width due to mounting errors can easily exceed the dimension of one symbol (e.g., about 1 mm on a DOF of 400 mm). Such problem reintroduces the issue of discriminating repetitive sequences without knowing the precise distance of the object.

Figure 14:
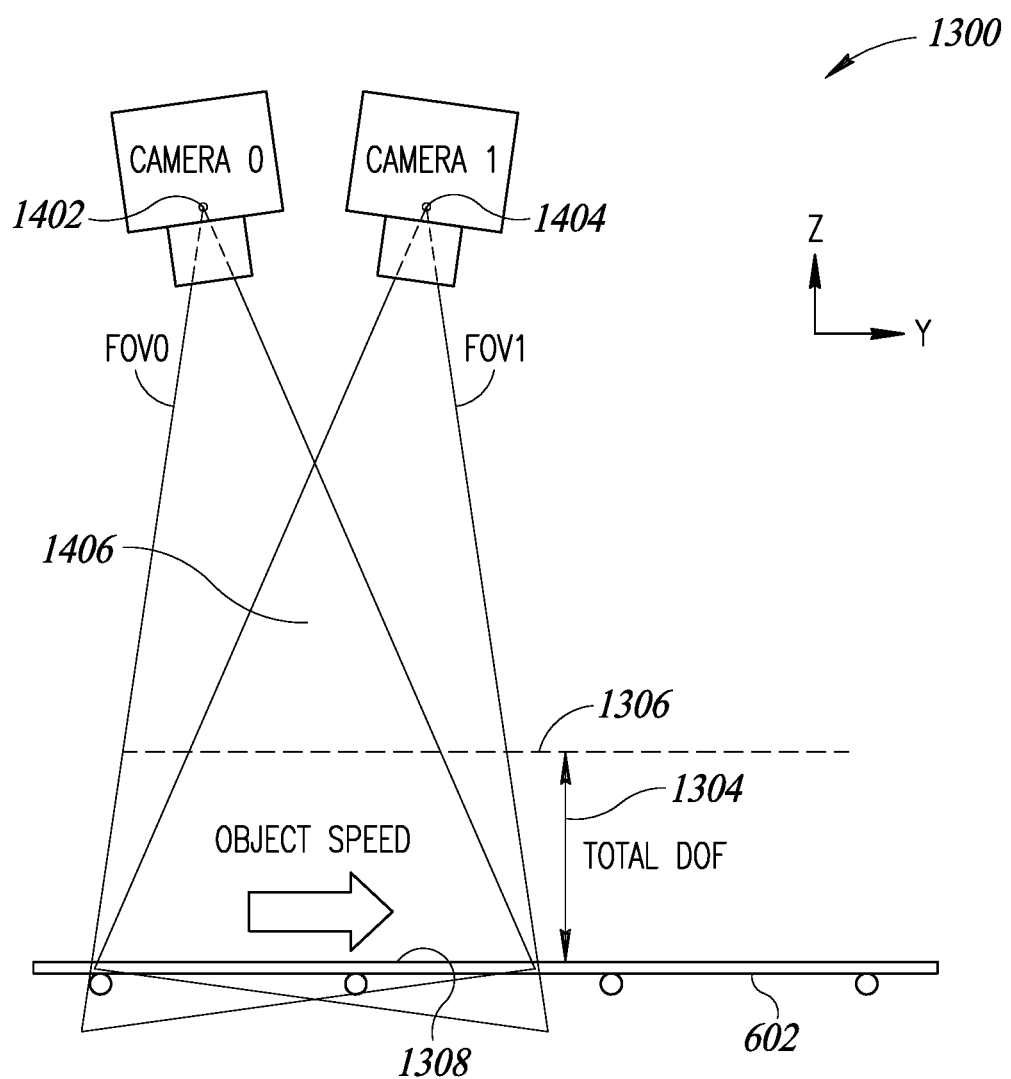
FIG. 14 is a left side elevational view of the imaging system of FIG. 13, according to one illustrated implementation.

FIG. 14 is a left side elevational view of the imaging system 1300 of FIG. 13. In this implementation, in addition to the cameras 0 and 1 being rotated about the rotation point or axis 1302 (FIG. 13) in the longitudinal direction (Y), each of the cameras 0 and 1 are rotated toward each other about respective rotation points 1402 and 1404, respectively, which extend in the lateral direction (X), to provide FOVs which substantially overlap in the longitudinal direction (Y). The cameras 0 and 1 may be synchronized to acquire images simultaneously or to acquire images with a well-known delay. The rotational angle between the two cameras 0 and 1 may be fairly small, which makes the additional loss of total system DOF 1304 negligible.

In an overlapping area 1406, the cameras 0 and 1 implement a stereoscopic view that can be used to estimate the distance of a symbol so that the symbol may be effectively stitched.

The geometrical methods to compute the best matching of two sets of points on images captured by two cameras are well known in computer vision (see for example Trucco E., Verri A., "Introductory Techniques for 3D Computer Vision", Prentice-Hall, 1998 chapter 7 "Stereopsys").

The following paragraphs show the advantages of implementing a stereoscopic view in the overlapped areas using an array of cameras positioned at different longitudinal (Y) positions as in FIGS. 13 and 14 compared to the classic array of cameras only positioned at different lateral (X) positions as in FIG. 6. For the purpose of simplicity, the description considers only a symmetric system as in FIGS. 13 and 14 with the two cameras very far from the target and with a small view angle.

Figure 15:
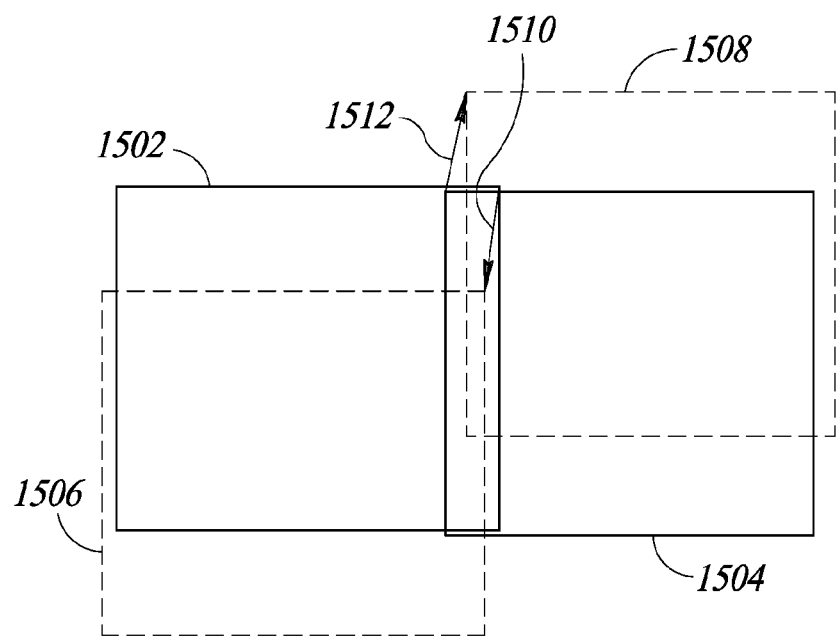
FIG. 15 is a schematic diagram showing images from the two cameras of the imaging system of FIG. 14 at a near limit of a depth of field and a far limit of the depth of field, according to one illustrated implementation.

FIG. 15 shows images 1502 and 1504 from the cameras 0 and 1, respectively, of the imaging system 1300 at the far limit 1308 of the DOF 1304. FIG. 15 shows in dashed lines images 1506 and 1508 from the cameras 0 and 1, respectively, at the near limit 1310 of the DOF 1304. An arrow 1510 shows the shift between the image 1502 of camera 0 at the far limit 1308 and the image 1506 of the camera 0 at the near limit 1310. Similarly, an arrow 1512 shows the shift between the image 1504 of camera 1 at the far limit 1308 and the image 1508 of the camera 1 at the near limit 1310.

Figure 16:
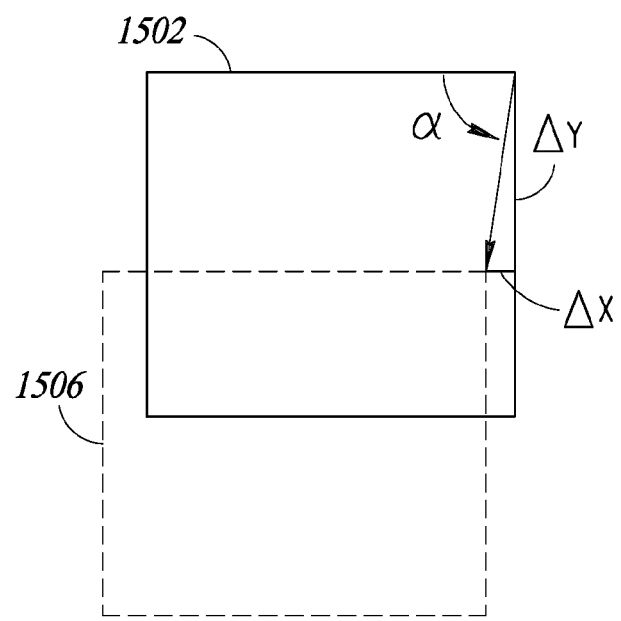
FIG. 16 is a schematic diagram which illustrates a shift of images captured by the two cameras of the imaging system of FIG. 14 at the near limit of the depth of field and the far limit of the depth of field, according to one illustrated implementation.

As shown in FIG. 16, as an object moves nearer or farther from the camera 0, the acquired images are shifted in both the lateral axis (X) and the longitudinal axis (Y) by a value dependent on the distance variation. A similar shift occurs for images captured by camera 1 (not shown). The shift in the lateral axis direction (X) is referred to as $\Delta X$, the shift in the longitudinal axis direction (Y) is referred to as $\Delta Y$, and a shift angle $\alpha$ is represented by the equation, $$\alpha = \tan^{-1} \frac{\Delta Y}{\Delta X}$$

For the imaging system 1300, the value of $\Delta X$ is much less than the value of $\Delta Y$. Ideally, when the cameras 0 and 1 are rotated exactly around the entrance pupil 1302 (FIG. 13), $\Delta X$ is equal to 0.

In terms of stereoscopic geometry, a given point in the image of camera 0 is acquired by camera 1 in a different position of a line, referred to as an epipolar line, based on the distance of the point from each of the cameras. In the camera configuration of the imaging system 1300, epipolar lines are only "nearly" parallel, but such may be ignored for explanatory purposes.

Figure 17A:
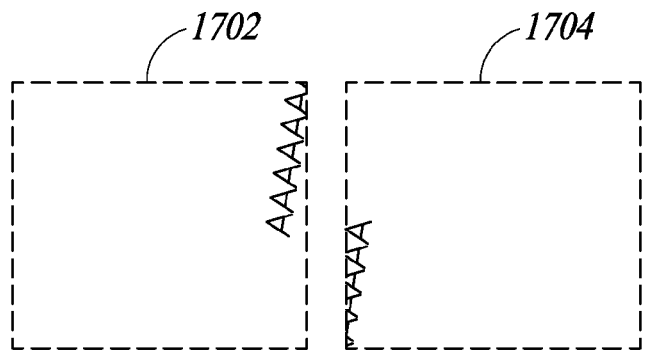
FIG. 17A is a schematic diagram of example images captured by the imaging system of FIG. 14, according to one illustrated implementation.
Figure 17B:
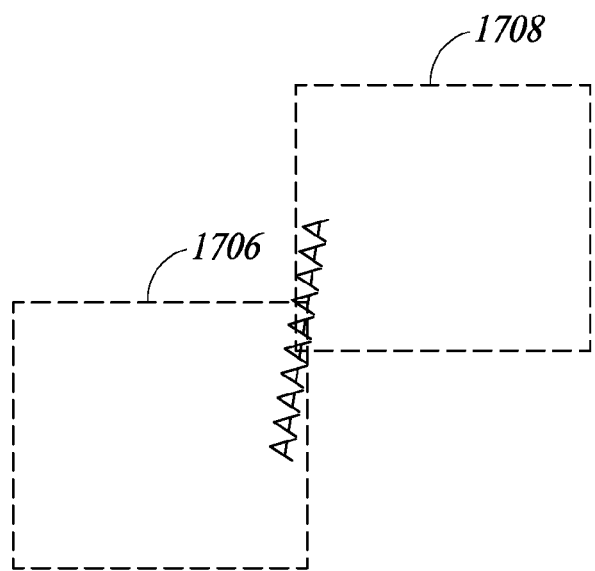
FIG. 17B is the correct reconstruction of the code from the two images of FIG. 17A if the code is near the imaging system
Figure 17C:
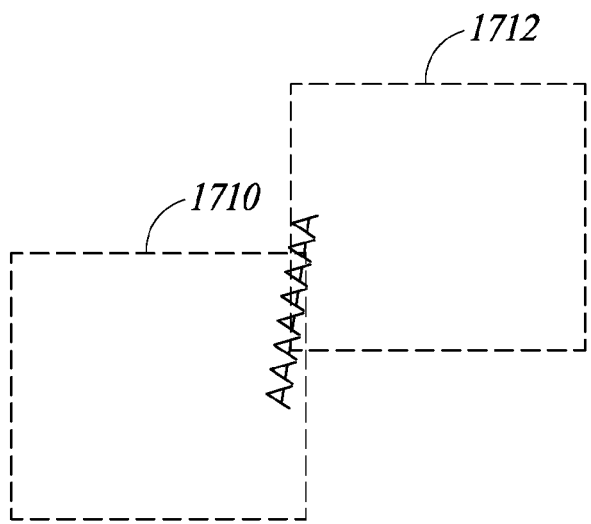
FIG. 17C is the correct reconstruction of the code from the two images of FIG. 17A if the code is far from the imaging system.

FIG. 17A shows images 1702 and 1704 of a repeating pattern captured by the imaging system 1300, FIG. 17B and FIG. 17C show two possible reconstructions of the code. If the captured code is near the cameras then the reconstruction of FIG. 17B applies. If the captured code is far from the cameras then the reconstruction of FIG. 17C is the correct one.

FIGS. 17A-17C show that the imaging system 1300 may not avoid the problem of estimating the code distance to distinguish repeating patterns, but this issue only applies to patterns oriented in the shift direction (i.e., the slope $\Delta Y/\Delta X$). As discussed above, $\Delta X$ may be nearly zero, so the shift direction is primarily in the longitudinal direction (Y). For symbols which are oriented at angles greater than or less than the shift angle $\alpha$, the imaging system 1300 can estimate the actual shift and match two partial symbols correctly.

Generally, the greater the ratio $\Delta Y/\Delta X$, the longer the symbol must be to cause reading problems. For a one-dimensional symbol, $$\alpha = \tan^{-1}(\Delta Y/\Delta X)$$

L=the maximum repeated pattern length (e.g., very near the maximum code length $W_{max}$)

The width W of the minimum overlap area need to avoid reading problems is, $$S_{min} = L \times \cos(|\alpha|)$$

As discussed above, $|\alpha|$ is approximately 90°, so $\cos(|\alpha|)$ is nearly 0.

Figure 18:
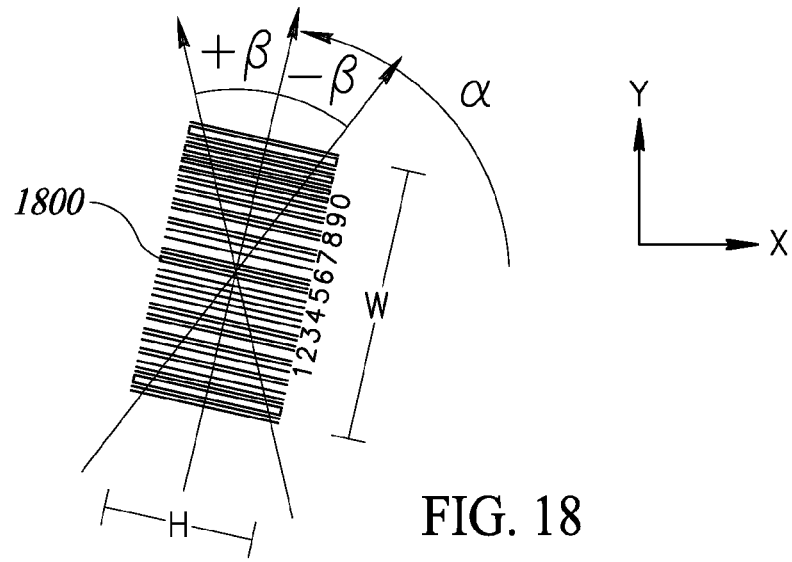
FIG. 18 is a schematic diagram of a barcode symbol which illustrates rotation angles of the barcode symbol which may be successfully decoded by the imaging system of FIG. 14, according to one illustrated implementation.

The redundancy introduced by the height of a one-dimensional symbol further reduces the minimum width $S_{min}$ of the overlap area. FIG. 18 shows a barcode symbol 1800 having a width W and a height H which illustrates rotation angles of the barcode symbol that may be successfully decoded by the imaging system 1300. As shown, the barcode symbol 1800 is oriented at the shift angle $\alpha$. However, due to the height H of the barcode symbol 1800, the barcode symbol contains repeatable patterns at angles which are much lower (e.g., $\alpha-\beta$) and much greater (e.g., $\alpha+\beta$) than the shift angle $\alpha$. If even only one of these patterns can be unequivocally defined, the imaging system 1300 may successfully read the barcode symbol.

Thus, for one-dimensional codes, $$S_{min} = L \times \min_{\gamma=\alpha-\beta,\alpha+\beta} \cos(|\gamma|)$$

$$\text{where, } \beta = \tan^{-1} \frac{W_{Max}}{H}$$

This significantly reduces the minimum overlap width $S_{min}$ in most cases. For example, as $|\alpha|$ is very close to 90°, the range $[\alpha-\beta, \alpha+\beta]$ will likely include 90°. Thus, in such instances, the minimum overlap width $S_{min}$ would be 0.

Additionally, with most types of symbols, using additional information such as check digits will be sufficient to make the probability of error low or null even with a sub-optimal minimum overlap width $S_{min}$.

As already mentioned in some applications the cameras don't acquire at the same time but with given delays. This may help to reduce the reading station dimensions in the Y direction, but requires a very good knowledge of the conveyor speed in order to know the actual geometry of the cameras in each pair of acquisitions.

The symmetric angle between cameras on the plane X,Y in FIG. 14 is advantageous but not necessary. In some implementations, the two cameras 1402 and 1404 have different angles or even parallel axes, e.g., orthogonal to the conveyor. Synchronizing the cameras with proper delays it is possible to acquire images with the partial overlap and different point of view on the Y axis necessary for the invention.

In some implementations the two cameras are substituted by a single camera that by means of its optical configuration, e.g., a splitting mirror, acquires different images in different portions of its acquisition area.

In some implementations, the cameras of an imaging system only exchange the symbols and the positions of the partially read symbols. Such feature reduces the information required to be exchanged between cameras, or between cameras and another processor-based system, and makes the communications requirements less challenging. Further, transmitting partially decoded information makes the process robust to image distortion, such as image distortion due to symbol tilt or skew.

In some implementations, two adjacent cameras of an imaging system may localize two portions of a symbol, exchange raw images, and execute a local image stitching. This process may also be utilized when it is not possible to execute partial decodes (e.g., some 2D symbols, OCR), but may require a higher transmission bandwidth and may be less tolerant to image distortion.

Figure 19:
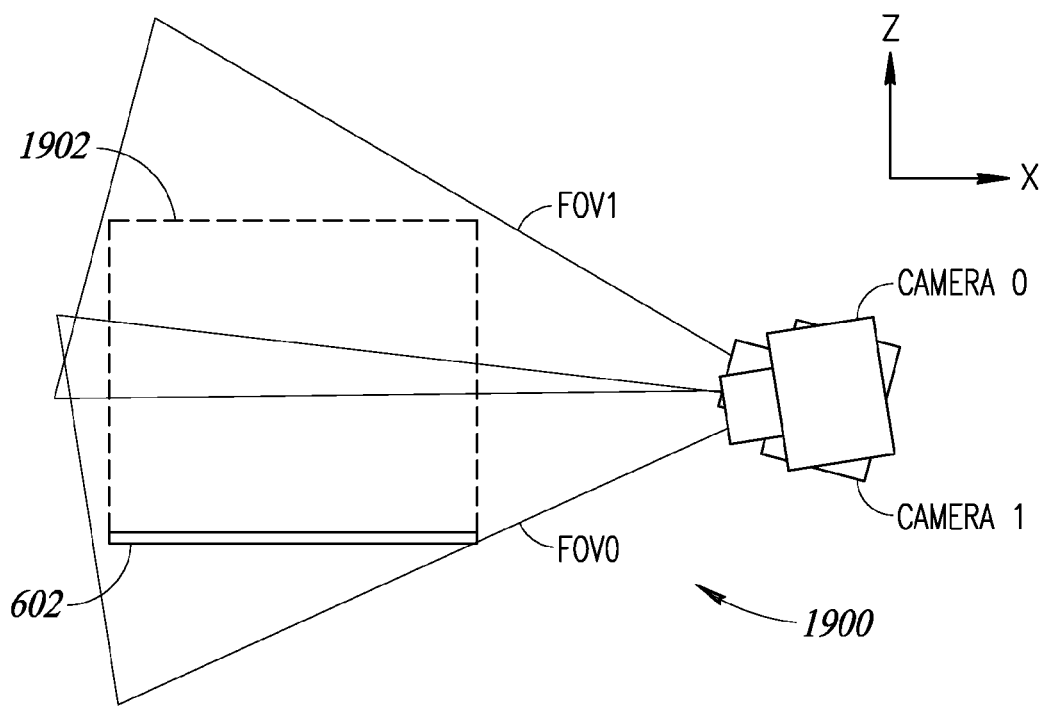
FIG. 19 is a front elevational view of another implementation of an imaging system which includes two cameras, according to one illustrated implementation.

FIG. 19 is a front elevational view of another implementation of an imaging system 1900 which includes cameras 0 and 1. In this implementation, rather than being positioned above the conveyor 602, the cameras 0 and 1 are positioned on a lateral side of the conveyor. The FOVs (FOV0 and FOV1) of the cameras 0 and 1, respectively, are directed to capture images of a sidewall of objects in a coverage area 1902. Similarly, an imaging system may include two or more cameras positioned toward the front and/or rear of objects moving in the coverage area 1902 to capture images of the front side and rear side, respectively, of the objects. In such implementations, the acquisition angles may be relatively higher than the implementations shown in FIGS. 14 and 19, for example.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. An imaging system to read symbols on objects conveyed by a conveyor, the conveyor having a movable support surface which lies in a plane which extends in a lateral direction (X) and a longitudinal direction (Y) orthogonal to the lateral direction (X), in operation the conveyor conveys the objects positioned thereon in the longitudinal direction (Y), the imaging system comprising:
   an array of cameras, comprising:
      a first camera directed toward the conveyor and rotated in a first direction about a rotation axis extending the longitudinal direction (Y) such that an optical axis of the first camera has an oblique angle with respect to a normal direction (Z) in a plane which lies in the lateral direction (X) and the normal direction (Z), the normal direction (Z) orthogonal to the lateral direction (X) and the longitudinal direction (Y); and
      a second camera positioned proximate to the first camera and directed toward the conveyor, the second camera rotated in a second direction, opposite the first direction, about the rotation axis extending in the longitudinal direction (Y) such that an optical axis of the second camera has an oblique angle with respect to the normal direction (Z) in a plane which lies in the lateral direction (X) and the normal direction (Z) and points away from the optical axis of the first camera in the lateral direction (X), at least a portion of the second camera aligned with at least a portion of the first camera with respect to the longitudinal direction (Y) to form the array of cameras along the longitudinal direction (Y).

2. The imaging system of claim 1 wherein the first camera has a first field of view and the second camera has a second field of view, the first field of view at least partially overlaps with the second field of view in at least the lateral direction (X).

3. The imaging system of claim 2 wherein the array of cameras has a total depth of field which spans between a near limit and a far limit, and a number of pixels in the first field of view which overlaps with a number of pixels in the second field of view is constant between the near limit and the far limit of the total depth of field.

4. The imaging system of claim 3 wherein the first camera and the second camera are configured to capture images that are shifted in both the lateral direction (X) and the longitudinal direction (Y) by a value dependent on a distance variation of the object within the total depth of field.

5. The imaging system of claim 4 wherein a rate of change of the shift in the lateral direction (X) is less than a rate of change of the shift in the longitudinal direction (Y) as the object distance variation changes within the depth of field.

6. The imaging system of claim 5 wherein the first camera and the second camera are configured to capture the images relative to each other according to a delay.

7. The imaging system of claim 4 wherein captured images have substantially zero shift in the longitudinal direction (Y) when the object is at the far limit of the total depth of field.

8. The imaging system of claim 2 wherein the first field of view and the second field each cover less than a width of the conveyor which extends in the lateral direction (X).

9. The imaging system of claim 8 wherein an overall field of view including the first field of view and the second field of view spans the width of the conveyor.

10. The imaging system of claim 1 wherein the first and second cameras are rotated toward each other about a rotation axis extending in the lateral direction (X) such that the respective optical axes of the first and second cameras have an oblique angle with respect to the normal direction (Z) in a plane which lies in the longitudinal direction (Y) and the normal direction (Z).

11. The imaging system of claim 10 wherein the first camera has a first field of view and the second camera has a second field of view, the first field of view overlaps with the second field of view in at least the longitudinal direction (Y).

12. The imaging system of claim 1 wherein the first and second cameras have respective entrance pupils which are aligned with each other in the longitudinal direction (Y).

13. The imaging system of claim 1 wherein the second camera is spaced apart from the first camera in the longitudinal direction (Y) by a separation distance, and during operation the first camera and the second camera are synchronized based at least in part on the separation distance and a velocity of the conveyor to obtain respective images which are parallel with each other with respect to the longitudinal direction (Y).

14. The imaging system of claim 1 wherein in operation the first camera and the second camera each partially decode a symbol and determine a location of the partially decoded symbol.

15. The imaging system of claim 14 wherein in operation one of the first camera and the second camera transmits the respective partially decoded symbol and determined location of the partially decoded symbol to the other of the first camera and the second camera.

16. The imaging system of claim 14 wherein in operation each of the first and second cameras transmits the respective partially decoded symbol and determined location of the partially decoded symbol to a processor-based system to be processed thereby.

17. The imaging system of claim 1 wherein the rotation axis of the first camera and the second camera align with the their respective entrance pupils in the longitudinal direction (Y).

18. A method of operation for an imaging system to read symbols on objects conveyed by a conveyor, the conveyor having a movable support surface which lies in a plane which extends in a lateral direction (X) and a longitudinal direction (Y) orthogonal to the lateral direction (X), in operation the conveyor conveys the objects positioned thereon in the longitudinal direction (Y), the method comprising:
positioning a first camera toward the conveyor, the first camera rotated in a first direction about a rotation axis extending the longitudinal direction (Y) such that an optical axis of the first camera has an oblique angle with respect to a normal direction (Z) in a plane which lies in the lateral direction (X) and the normal direction (Z), the normal direction (Z) orthogonal to the lateral direction (X) and the longitudinal direction (Y);
positioning a second camera proximate to the first camera and directed toward the conveyor, the second camera rotated in a second direction, opposite the first direction, about a rotation axis extending the longitudinal direction (Y) such that an optical axis of the second camera has an oblique angle with respect to the normal direction (Z) in a plane which lies in the lateral direction (X) and the normal direction (Z) and points away from the optical axis of the first camera in the lateral direction (X), at least a portion of the second camera aligned with at least a portion of the first camera with respect to the longitudinal direction (Y) to form the array of cameras along the longitudinal direction (Y); and
causing each of the first camera and second camera to capture respective images of an object positioned on the conveyor.

19. The method of claim 18 wherein the first camera has a first field of view and the second camera has a second field of view, wherein the first field of view overlaps with the second field of view by a greater amount in the longitudinal direction (Y) than in the lateral direction (X).

20. The method of claim 18 further comprising stitching a symbol located on the object captured in part by the images captured by the first camera and the second camera.

21. The method of claim 20 wherein stitching the symbol is responsive to an estimate of a distance of the symbol within a depth of field of the first camera and the second camera.

22. The method of claim 21 wherein the estimate of the distance is based, at least in part, on determining a shift angle between a first image captured by the first camera and a second image captured by the second camera.

23. The method of claim 22 wherein the shift angle is responsive to determining a change in shift distance in the lateral direction (X) and a change in shift distance in the longitudinal direction (Y).

24. The method of claim 23 wherein the change is determined relative to the images captured at a far limit of the depth of field.

25. The method of claim 23 wherein a rate of the change in the shift distance in the lateral direction (X) is less than a rate of the change in the shift distance in the longitudinal direction (Y) for objects that approach a near limit of the depth of field relative to a far limit of the depth of field.

* * * * *